May 5, 1953 H. A. PAVITT 2,637,671
POWDER METALLURGY METHOD OF MAKING STEEL CUTTING TOOLS
Filed March 13, 1948 3 Sheets-Sheet 1

Inventor
Harry A. Pavitt
By Clayton L. Jenkes
Attorney

Harry A. Pavitt

Inventor
Harry A. Pavitt
By Clayton L. Jenks
Attorney

Patented May 5, 1953

2,637,671

UNITED STATES PATENT OFFICE 2,637,671

POWDER METALLURGY METHOD OF MAKING STEEL CUTTING TOOLS

Harry A. Pavitt, Shirley, Mass., assignor to Simonds Saw and Steel Company, Fitchburg, Mass., a corporation of Massachusetts Application March 13, 1948, Serial No. 14,718

2 Claims. (Cl. 148—12.4)

This invention relates to a method of making steel cutting tools by powder metallurgy.

Various types of articles, such as porous oil-filled bearings and small machine parts, have been made by compacting iron powder and thereafter sintering the compact. The attempts to make steel articles have met many obstacles, and particularly the inability to control the chemical composition and the crystalline structure and to secure a satisfactory atomic bonding and the required density and tensile strength, as well as prevent cracking or the formation of detrimental internal stresses. Hence, the research in the industry has veered towards the cemented powder practice, such as is involved in making cutting tools of tungsten carbide cemented with cobalt. That is, it has been proposed to bond iron particles with copper or other soft metal, but such cemented products are not satisfactory substitutes for tool steel. A cutting tooth, such as a saw tooth, requires a cutting edge having a high tensile strength and density, as well as resiliency or resistance to shock and other characteristics inherent in a rolled steel. Because of the exacting requirements of a tool steel, it has been considered impractical to make it from a mixture of the elemental ingredients.

It has also been proposed to make a shaped steel body from a steel of required composition by pulverizing, compacting and sintering it in the desired shape. For example, stainless steel for an 18-8 alloy, composed of 18% Cr, 8% Ni and 0.08% C, the balance being Fe, has been disintegrated to a powder by a corrosion method involving heating the steel to form carbides in the grain boundaries and then disintegrating it by a corrosive reagent. In that processing, part of the metal and the carbon are lost. The compacted and sintered body, therefore, differs from the powder composition, as well as involving a complicated and expensive procedure. Other proposals have related to making a low carbon ductile steel by compacting and sintering powdered iron and iron carbide, or iron and graphite up to 0.15% total C content, but the proposed methods have made steels that are unsuited for use as a cutting tool. All of the recent attempts to make steel have not produced the hardness, density, strength and structure required of a cutting tool steel, and the experts have considered it impossible to attain that type of steel by the procedures of powder metallurgy. Hence, the production of a cutting tool, such as a saw tooth, for example, has necessitated forging a tool steel rod and subjecting the forging to many expensive operations; although the simplified methods of compacting and sintering powder in the final shape have been most attractive to the steel tool makers.

The standard procedure of powdered iron metallurgy has comprised compacting iron and carbon powders, then sintering the compact to develop an austenitic solid solution and thereafter cooling slowly. In this method, if a low carbon iron mass is sintered at a temperature within zone A (Fig. 3) of the equilibrium diagram of iron and carbon and then cooled slowly, the solid solution of carbon in gamma iron passes through the conditions of zone B where alpha iron ferrite, the excess phase material, and austenite exist, and these are subsequently transformed to pearlite and ferrite in zone C. A high carbon solid solution cooled slowly from zone A transforms in zone D to austenite the excess phase material, and cementite, and further cooling to zone E causes a transformation to pearlite and cementite. The photomicrographs of rolled steels indicate that pearlite comprises alternate lamellae of ferrite and cementite. Also, the slow cooling results in a coarse pearlite bounded by a network of cementite in a hypereutectoid steel and a network of excess ferrite in a hypoeutectoid steel at the original austenite grain boundaries. In each type of steel, the grain boundary network produces a weak structure and may result in fractures or detrimental stress if the sintered compact is later coined to increase the density. It is also desirable that the cementite, or iron carbide $Fe_3C$, as well as other metal alloy carbides, be present prior to coining as minute spheroidal precipitates in a fine grained alpha iron structure, and after coining and sintering the product be martensitic and free from a grain boundary network; but the prior proposed powdered metal practice has not produced such structures.

Moreover, the standard practice has involved filling the mold level full with the powder and then compressing it with the plunger of required shape; and this procedure applied to an edged tool has resulted in the formation of a laminated stress structure that sheared readily and caused the tool to break under standard usage. In a cutting tool having a tapered wedge-shaped cutting edge, the laminated structure forms primarily in the wedge portion where the primary stress is met during working use. For such reasons, it has not been heretofore feasible to make a sharp cutting tool by the methods of powder metallurgy.

The primary object of my invention is to overcome these difficulties and to provide a method of making a tool steel article to required density and hardness from powdered materials.

A further object is to make a cutting tool, such as a saw tooth, which will give satisfactory service.

Another object is to make a cutting tool in which the steel structure has a high density and tensile strength, particularly at the cutting edge, which is substantially free from grain boundary networks and has a typical martensitic structure.

A further object is to make a molded powder steel cutting tool having carbon and manganese and/or molybdenum and other alloying metals, alloyed with iron and providing desired metallurgical characteristics.

A further object is to provide a method of making an edged tool from molded powders wherein the content and distribution of the carbon and the alloying metal are controlled.

A further object is to provide a method of making a cutting tool by compressing a required mixture of powders and thereafter sintering the mass, in which the sintering and cooling stages are so controlled that the desired crystalline structure is obtained.

A further object is to provide a method of making a steel cutting tool of high density at the tool edge wherein a mass of powdered materials may be subjected to compacting and heat treating operations which are so controlled and coordinated that the required density and strength may be obtained without disrupting the structure.

Another object is to provide a method of making a tool steel article from a body of compacted powders in which the density is increased by coining after it has been made ductile by a heat treatment which provides a non-laminated structure free from a grain boundary network.

Another object is to provide a method of making an irregularly shaped steel tool having a cutting edge wherein the pressure of molding the powders is prevented from forming a laminated structure or parallel stress planes along which shearing may take place but the powder distribution is so coordinated with the direction of the applied pressure as to provide a desired or increased density at the tool edge.

Other objects will be apparent in the following disclosure.

Referring to the drawings.

In accordance with my invention, I propose to make an edged tool, such as a saw tooth, chisel, file, drill bit, lathe tool, milling cutter or other cutting tool, from a mixture of ingredients in powdered form which are compacted, sintered and quenched to provide the desired steel structure. Of the various steel forming ingredients available for the process, I prefer to employ substantially pure annealed iron powder, carbon and one or more alloying elements in suitable form, and preferably as a ferro-alloy, and wherein the carbon may be introduced both as graphite and in combination with the ferro alloy. A measured amount of the proportioned ingredients is compacted under a required pressure to form approximately the shape of the final article. Thereafter, this powder compact is sintered to develop an austenitic solid solution below the melting point of any of the ingredients. The sintering is carried on in an atmosphere controlled to protect the compact, so as not to increase or decrease materially the content of the carbon or any of the alloying elements. To develop ductility, the sintered body is held at a temperature within the zone A indicated on the iron-carbon diagram of Fig. 3, then the mass is quenched or cooled rapidly through zone B or D so as not to form a ferritic or cementite grain boundary network in the hypoeutectic and hypereutectic steels respectively; and the compact is held at a temperature which develops a coinable structure. The density is further increased by a coining or second compacting step; and the compact is again sintered and then quenched to develop a tempered martensitic structure. This quenching operation is preferably accomplished by suddenly immersing the sintered body in a cooling bath, such as molten metal or salt, which is maintained below the critical temperature of the $A_{1-3}$ line.

The major aspects of this invention may be summarized as involving the following preferred steps:

(a) The alloying metals, such as manganese and/or molybdenum and other alloying metals, including W, V, Cr and Si, are introduced as a ferro-alloy. Ni and Co may be added as metals.

(b) The ingredients are provided as a mixed powder of iron, graphite and the alloying metal, which may contain carbon in combination. The powder has the required composition, size, shape and structure. It is so placed in the mold that it will flow readily during compacting and provide a satisfactory distribution and density, and particularly at the cutting edge, which should be free from a laminated structure or stress planes.

(c) The powder is compacted at a pressure within the capability of the material to flow satisfactorily without being subjected to shearing stresses at critical points.

(d) The compact is sintered at a temperature within the zone at which the carbon and the alloying metals are present as an austenitic solid solution in gamma iron, but the temperature is well below the formation of any liquid phase.

(e) The sintered body is cooled rapidly through the zones B and D of the equilibrium diagram of iron and carbon so as to prevent the formation of a ferritic or cementitic grain boundary network, and it is held at a temperature just below the $A_{1-3}$ line (Fig. 3) to develop a ductile coinable mass having a spheroidal cementitic precipitate in a ferritic matrix.

(f) The compact is coined to provide substantially the final shape and size and to increase the density.

(g) The coined compact is again sintered to develop the austenitic solid solution.

(h) Then the compact is quenched from a temperature above the $A_{1-3}$ line at a rate exceeding the critical cooling rate of the steel to a hardening temperature and there held to develop the desired tempered martensitic structure, which is free from grain boundary networks.

(i) The sintering furnace atmosphere is so controlled that the carbon and alloying metal contents are held substantially constant, and oxidation of the metals or other chemical reactions therewith are minimized.

Figure 5:
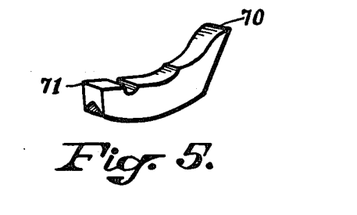
Fig. 5 is a perspective view of a saw tooth made according to this invention.

I may make an edged tool, such as a removable saw tooth of the type shown in Fig. 5, of steel ingredients including iron and carbon with one or more alloying metals in accordance with the following procedure. For making the compact, I prefer to use ductile iron of high purity and preferably having a round or somewhat spheroidal shape made by suitable procedure, such as by reduction of iron oxide or carbonyl or by electrolytic deposition. A suitable electrolytic powder has approximately the following composition:

| | Per cent by weight |
|---|---|
| Fe | 99.88 |
| C | 0.008 |
| Mn | 0.019 |
| Si | 0.006 |
| P | 0.002 |
| S | 0.004 |
| Cu | 0.006 |
| Loss in hydrogen | 0.09 to 0.3% |

The weight loss by heating in hydrogen represents the degree of oxidation.

The alloying ingredients may be used in widely varying proportions, depending upon the type of steel required and the structure of the saw tooth. I preferably use Mn and/or Mo. Also, other metals, such as V, W, Ni, Co or Cr, may be incorporated in the steels in desired amounts. As a specific example, I may use a ferro-manganese powder containing 78.82% of manganese, 7.0% of carbon and the remainder iron. A suitable ferro-molybdenum powder contains 86.03% of molybdenum, 0.20% carbon, and the remainder iron. These are so proportioned with the iron and graphite as to give the required carbon, manganese and molybdenum content. That is, the graphite powder is proportioned to take into account the amount of the combined carbon in the ferro-alloy, so as to give the desired percentage in the final steel product, there being substantially no loss or addition of carbon during sintering because of the protective atmosphere employed.

The various metals are used within the proportions set forth in the following table, giving examples of steel compositions that are serviceable for making edged tools:

| | Low Limits | High Limits | |
|---|---|---|---|
| | | Tool Steel | High Speed Tool Steel |
| | *Percent* | *Percent* | *Percent* |
| Carbon | 0.40 | 1.25 | 1.5 |
| Manganese | .20 | 1.0 | 1.0 |
| Silicon | .05 | 1.0 | 1.0 |
| Molybdenum | .10 | 3.0 | 8.0 |
| Chromium | .25 | 4.0 | 15.0 |
| Tungsten | .10 | 4.0 | 20.0 |
| Vanadium | .15 | 1.0 | 4.0 |
| Nickel | .50 | 5.0 | |
| Cobalt | .10 | 1.0 | 10.0 |

In the claims, the expression "alloyable percentage of one or more metals selected from the group consisting of manganese, molybdenum, silicon, chromium, tungsten, vanadium, nickel and cobalt and proportioned to form a tool steel" is to be interpreted as limited to the alloying ingredients used in the proportions set forth in the table immediately above.

The alloying metals are held within their solubility limits in the gamma iron at the temperature of sintering; and they are further proportioned according to the desired structure and composition of the steel. For example, manganese forms a carbide slightly more readily than does iron, while molybdenum has a strong carbide forming tendency; hence each appears in the final structure as a carbide. I have found that elemental manganese and molybdenum metals will not diffuse readily in the iron of the compact and their use creates a laminated structure, due primarily to their shape and hardness which causes slippage under pressure. But the ferro-alloys distribute the metal, aid diffusion, and prevent laminating. As a result of their spheroidal shape and lesser degree of hardness, slippage is minimized. It is desirable that the various powders have clean surfaces and be free from a deleterious amount of an oxide film or other chemical compound.

The free carbon is preferably in the form of graphite having a non-flaky shape, since flake graphite tends to form parting planes and a laminated structure in the wedge shaped tool edge during the compacting operation, due to the ease with which the powders slide on the smooth graphite surfaces. Such carbon as is present in the ferro-alloy diffuses in the gamma iron.

The preferred screen sizes of the various powders are 100 to 200 mesh or finer, i. e., the powders will pass through a screen having 100 or 200 meshes per linear inch. Also, the sizes may be selected to give a maximum or desired packing. A powder passing through a 100 mesh screen may have the following particle sizes that are suitable for making a steel compact:

| Screen | Percentage |
|---|---|
| −80 to −100 mesh | trace. |
| −100 to −200 mesh | 15 to 20. |
| −200 to −325 mesh | 15 to 25. |
| −325 mesh | 60 to 70. |

A −200 mesh composition suitable for making a steel compact has the following screen sizes:

| Screen | Percentage |
|---|---|
| −100 to −200 mesh | 1% maximum. |
| −200 to −325 mesh | 25 to 30%. |
| −325 mesh | 70 to 75%. |

The other ingredients of the compact may run according to the same sizes. Wide variations may be made in the sizes and shapes, as well as structure and composition; but it is desirable to avoid flat shapes for all of the powders. The iron and the ferro-alloy should be comparatively soft and deformable so as to provide atomic bonding when compressed, due to the surfaces being deformed locally into intimate contact.

The ingredients may be mixed in desired proportions according to the required characteristics. I may, for example, mix the powders according to the following table showing both the proportions of the mixed powders and the resultant final composition of the sintered compact, the balance being iron:

*Percentages by weight of saw tooth ingredients*

|  | Percent Carbon in— | | Percent Manganese in— | | Percent Molybdenum in— | |
| --- | --- | --- | --- | --- | --- | --- |
|  | Powder | Steel | Powder | Steel | Powder | Steel |
| Tooth A | 1.0 | 0.95 | 0.50 | 0.47 |  |  |
| Tooth B | 1.0 | 0.97 | 0.65 | 0.62 |  |  |
| Tooth C | 1.0 | 1.01 |  |  | 0.10 | 0.08 |

The above table shows that the percentages of the ingredients in the powder and in the final steel product have remained substantially uniform or with very little loss. The powders are mixed thoroughly to provide a uniform distribution and are then filled in the mold, as hereinafter described, to provide a satisfactory flow and substantially uniform distribution during the compacting step.

The powder is subjected to what may be termed a moderate pressure of about 30 to 60 and preferably 40 tons per square inch. It is held below that critical value at which the particles can form slippage or shear planes. Also, too high a pressure tends to harden the work or form a dense surface layer or skin which entraps gases and results in forming surface bubbles during sintering. It is desirable that the metal flow readily up to the point of final compacting. This pressure serves to increase the contact areas of the particles by plastic flow and bring such areas into contact for atomic bonding. The grains in a random orientation elongate and orient in the direction of pressure flow; hence the pressure should be limited to avoid forming an excessive fibre structure or laminations. This pressure varies with the nature of the powdered ingredients, but, for the irregular shape of a saw tooth, the powders are preferably so sized and proportioned as to have a compressibility of about 2.4 at 40 tons per square inch. This means that the loose powder in the mold occupies a volume 2.4 times that of the finished product. This compressibility may be greater for more regular shapes than the saw tooth illustrated in the drawing, such as a compressibility of 3.5 for a cylindrical or cubical shape.

Standard procedure may be employed for this compacting stage. Although the powders may be compressed at an elevated temperature, I preferably use them at room temperature and employ the pressure solely for the atomic bonding that has to be accomplished at this stage, and particularly since the subsequent steps are adequate to form the steel of desired density. In the process as so far described, the ferroalloy particles of iron and manganese and/or molybdenum of the preferred saw tooth are in such intimate association with the other iron particles that the pressure forces them to flow into an atomic contact. This assures that the metals and their combined carbon are substantially uniformly distributed throughout the mass and that during the sintering step the pure iron and the alloy metal will diffuse and coalesce as an integral structure. The powders may be molded with or without an additional lubricant, but for the latter I preferably use a hard wax or zinc stearate. This lubricant aids the particles in flowing readily under the pressure of the plungers and filling the mold substantially uniformly; but being a low volatile compound the lubricant disappears fully during the sintering operation. The lubricant may be used in the amount of 0.5 to 1.0% by weight of mass.

The next major step is that of sintering the compact. During sintering and cooling, the mass recrystallizes and forms new crystallites which grow both inwardly from the surface and across the grain boundaries and so unite the particles as an integral structure. This is accomplished in a sintering furnace of suitable construction, such as one heated by induction, or preferably by an electrical resistance element.

The compact is sintered at a temperature which brings it well within zone A of Fig. 3 but below the point at which a liquid phase may be formed. I prefer that the temperature be held within the range of 1900 to 2200° F. and preferably at about 2050° F. for the above specified manganese or molybdenum steels. This temperature is maintained for a suitable time, such as one to five hours, and preferably about two hours, to diffuse the ingredients and prepare the mass for subsequently obtaining the required ductility, density, strength and other characteristics. This stage forms austenite or a solid solution of the manganese or molybdenum and carbon in gamma iron. The body is held at the sintering temperature long enough to obtain the solid solution, it being noted that the lower the temperature the longer will be the time. The sintering time and temperature are also dependent on the particle sizes, voids, compacting pressure, surface films, impurities, etc.

A vertical cooling curve for a hypereutectic steel having 1.0% carbon cuts through the zone D; and if the cooling were allowed to proceed at a normal slow rate, this would result in the formation of a network of cementite. Similarly, a hypoeutectic steel forms a network of ferrite, the excess phase material, at the austenite grain boundaries when cooled from zone A at a rate below the critical. I avoid that detrimental result by cooling the body at such a rapid rate that the network cannot be formed to a material extent. To that end, I quench the mass quickly to a point well below the critical temperature of 1337° F., the $A_{1-3}$ line of Fig. 3. The cooling rate for either quenching step in this process must be higher than the critical cooling rate curve shown in Fig. 4, and the cooling curve of the saw tooth should not intercept that critical rate curve until after it has passed well below the $A_{1-3}$ line. The critical cooling rate is the slowest rate at which the solid solution can be cooled to obtain a martensitic structure. The cooling is, therefore, accomplished in preferably less than one second. This may be done by quenching the body quickly from substantially its maximum temperature of sintering, which was at least 1600° F., and preferably after cooling in the furnace atmosphere to a temperature, such as about 1500° F. for a 1.0% carbon steel, at which the compact material is the stable austenitic solid solution of zone A.

For a low temperature quenching bath, I may employ a molten salt, such as a mixture of $KNO_3$ and $NaNO_3$ which melts at 430° F. and has a working range of 550° to 1100° F. For a high temperature quench, I may use a triple salt mixture of Na, K and Ba chlorides which melts at 980° F. and has a working range of 1100° to 1650° F. Other suitable baths may be used.

Figure 6:
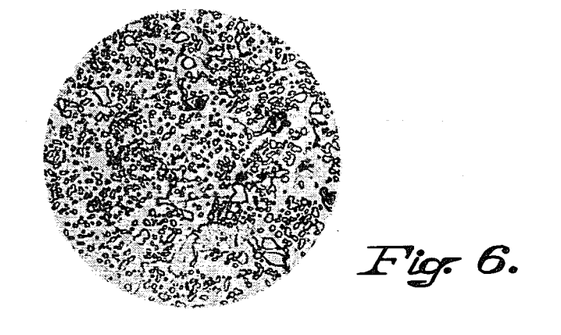
Fig. 6 is a photomicrograph of the steel tooth after the first quenching step.

In order to obtain the required tool steel characteristics, I employ two sintering operations separated by a coining or compressing step. The first cooling stage is, therefore, in accordance with the #1 curve of Fig. 4, which brings the compact temperature quickly to a point just below the $A_{1-3}$ line, where it is held above 1000° F. and preferably in the neighborhood of 1200° to 1300° F. for a suitable period, such as 15 minutes to 1 hour, to form the ductile spheroidal cementite in a ferritic matrix, as shown in Fig. 6. This step serves the double purpose of making the body coinable and at the same time preventing the formation of a grain boundary network. Hence, after quenching, the temperature is held between 1000° F. and 1337° F. long enough to form the desired ductile structure. The structure is fixed by the horizontal line portion of the quench curve #1 as a ductile body. Thereafter, the body is cooled, as indicated by the curve in Fig. 4, to a lower temperature which is not critical but may be any temperature limited by that of the room which the body may attain before it is coined to its final shape.

This ductile body is then subjected to coining or compressing in a mold shaped in accordance with the final desired shape of the cutting tooth under a suitable pressure, such as 20 to 60 tons per square inch and preferably at about 40 tons per square inch. This compressing step serves to true up the sides and bring the body to substantially its final dimensions, and it presses out some of the voids and increases the density. This must be done before the steel has reached its final hard condition, as provided by the curve #2, and while it is ductile or can still flow readily. But the pressure must be low enough to avoid fracturing or forming undue strains.

Figure 7:
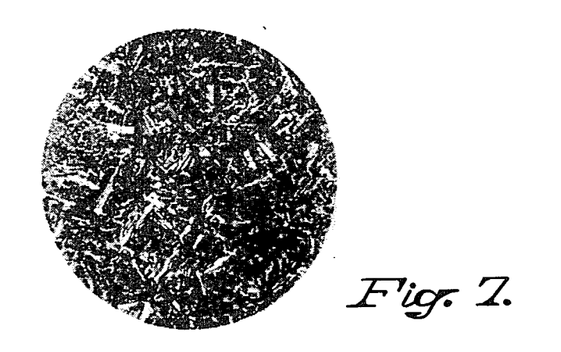
Fig. 7 is a photomicrograph of the same article after the second quenching step and as ready for use.

Thereafter, the coined saw tooth is heated again in the sintering furnace within the range of 1600° and preferably 1900° F. to 2200° F., such as 2050° F., and held for a period of 1 to 5 hours until the mass again consists of an austenitic solid solution of gamma iron containing carbon, manganese and/or molybdenum and the other alloying metals. Then the body is quenched to a steel hardening temperature in the neighborhood of 400 to 800° F., such as 700° F. This is carried on in accordance with the #2 curve of Fig. 4, so that an excess phase network cannot be formed to a material extent. If desired, the body may be initially cooled in the furnace atmosphere from 2050° F. to a temperature well above the transition curves of Fig. 3, such as 1500° to 1600° F. before it is dropped into the quench bath. This lowering of the compact temperature, while holding it in zone A, minimizes the thermal shock incident to quenching. The quench is obtained by dropping the compact quickly into a large body of molten salt, as above defined, which lowers the temperature rapidly in less than 1 second to a point below the $A_{1-3}$ line. The compact is held in this bath for a suitable time, such as 15 minutes to 1 hour until the hardening is accomplished and a tempered martensite is developed free from any grain boundary network, as shown in Fig. 7. Thereafter it is removed and allowed to cool normally. The length of the time and the temperature of the horizontal portion of curve 2 (Fig. 4) are such as to obtain the required temper and hardness and the structure shown in Fig. 7.

Figure 1:
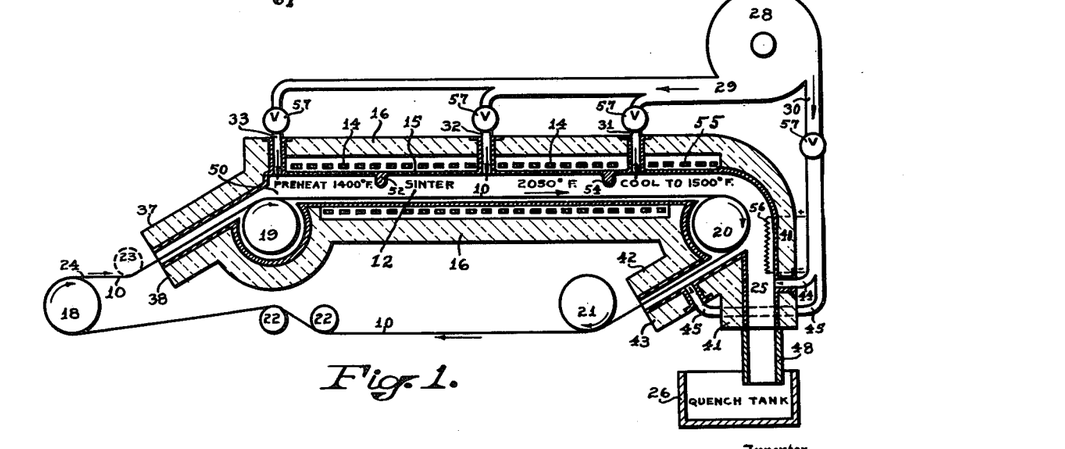
Fig. 1 is a diagrammatic sectional view of the sintering and cooling apparatus which will make a molded saw tooth.

To satisfy these sintering and quenching requirements, I provide a sintering furnace of the type shown in Fig. 1. In this construction the compact, such as the removable saw tooth of Fig. 5, may be carried progressively through the sintering furnace on an endless belt 10 made of suitable high temperature wire, such as a woven wire mesh of a suitable alloy that is resistant to the high temperature and atmospheric conditions involved. The sintering furnace may comprise a tunnel 12 of suitable length through which the belt and its burden passes. The furnace may be heated by a suitable means, such as a globar resistance type of heating element 14 arranged in a space around a muffle 15 made of heat resisting material, such as an "inconel" alloy of 11 to 15% of Cu, 1% maximum of Mn, 70% minimum of Ni, the balance being iron. Any other desired refractory body may be used. The belt 10 may be made of the same material. Insulating walls 16 surround the radiant elements and restrain the passage of heat therethrough. The endless belt may be suitably mounted on rollers 18, 19, 20 and 21, and further rollers 22 and 23 may be employed to tighten the belt and direct it properly through the muffle or furnace. The compacted saw tooth may be loaded on the upper run of the belt at the loading stage 24 and then be carried progressively through the furnace. At the right-hand end of the furnace, the compact drops from the belt through a vertical passageway 25 into the quenching tank 26.

Control of the sintering atmosphere is important in order to hold the carbon content constant and prevent oxidation. To this end, I introduced into the sintering furnace a substantially neutral, non-oxidizing gas which prevents either carburization or decarburization of the mass. A preferred gas comprises dry cracked ammonia mixed with propane, which are free from oxygen and water vapor. The nitrogen and hydrogen derived from the ammonia provide a reducing condition and prevent oxidation, and the propane, which may be cracked at the temperature of sintering, provides a carbon vapor pressure balancing that of the compact so that the graphite is not lost but dissolves in the iron. The gas may be held under a pressure of 0.1 inch water or sufficient to insure that water vapor or outside air cannot enter and that the furnace is filled with the protective gas. Hence, the carbon loss of the compact composition is minimized. This protective atmosphere may also fill the approach to the quenching bath so that the compact is fully protected until cooled below a critical point. The proportions of the gas ingredients may be widely varied within the above specified requirements.

The protective gas is conducted from a suitable supply source and forced into the furnace by means of a centrifugal pump 28. It passed through a main duct 29 from which it is distributed into lateral ducts 30, 31, 32 and 33 for introduction into various parts of the furnace. The gas is supplied under a low pressure but sufficient to maintain an outwardly flowing gas at all openings to the atmosphere so that air may not enter the furnace or kiln.

Effective gas seals are provided by having both the entrance and the exit for the compact arranged well below the horizontal portion of the furnace muffle in which the compact is sintered. The entrance passage is formed by having the front walls 37 and 38 slope downwardly and the belt pulley 18 is well below the pulley 19 which guides the belt at its horizontal run. Hence, the compacts loaded at the station 24 have to go uphill along the belt through the entrance, and the pressure of gas within the kiln is such that this entrance will be kept filled with a steady stream of the protective gas flowing outwardly through the entrance opening. Hoods or other suitable construction may be provided to take care of the escaping gas, or if it is combustible it may burn at the entrance where it contacts with the atmosphere.

At the exit end, the walls 40 and 41 and associated parts are arranged to provide the vertical passage 25. Further walls 42 and 43 form an upwardly sloping narrow passage sufficiently wide for the belt to travel downwardly therethrough on its return journey. The wall 41 meets the wall 43 just below the pulley 20 where the horizontal run of the belt terminates, and the pulley 20 is so located that the compacts are obliged to fall downwardly through the vertical passage 25. A valved gas pipe 44 leads from conduit 30 to the vertical passage 25 and another valved conduit 45 likewise introduces the protective gas into the downwardly sloping passage defined by the walls 42 and 43. The pipe 33 supplies the protective gas at the entrance end of the furnace. Pipes 31 and 32 connect with the heated part of the muffle. Thus, these various pipe lines insure that the compact is in a controlled atmosphere throughout its entire passage through the sintering furnace and until it has dropped into the quenching tank.

It is desirable to preheat the compact in a preliminary zone 50 where the temperature is brought up gradually to a point of about 1400° F. by the time the compact passes under a baffle 52 that projects downwardly within the muffle 15 to a point just above the compacts on the belt. Another baffle 54 defines the far end of the sintering compartment of the furnace. Between these two baffles, the temperature is maintained in the vicinity of 2050° F., and this portion of the muffle kiln is made long enough to make sure that the compact is held at the sintering temperature as it travels for the required period of time.

Figure 3:
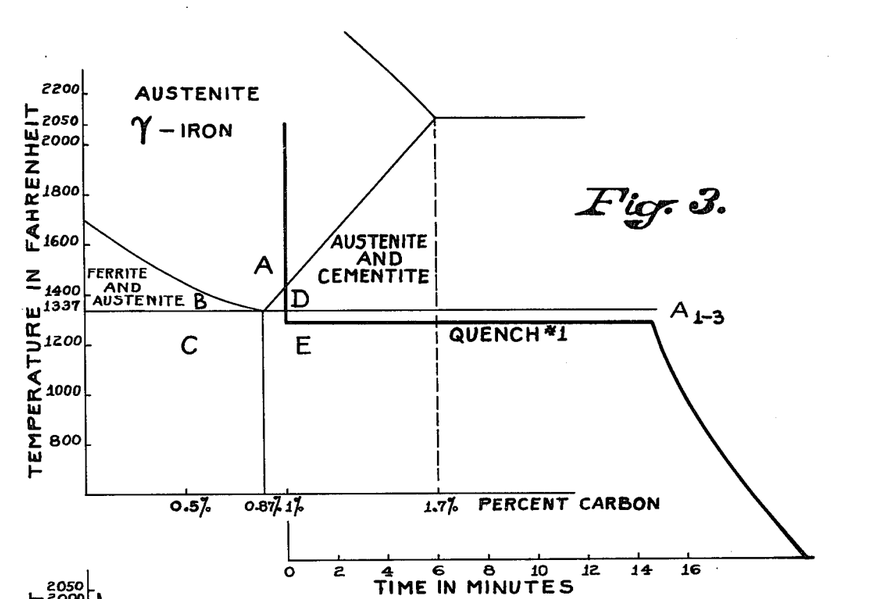
Fig. 3 is an equilibrium phase diagram of iron and carbon and having superimposed thereon a sintering and cooling curve plotted as to temperature and time.

It is further desirable to cool the sintered compact having 1.0% carbon to about 1500° F. or while the steel is held in zone A of Fig. 3 before it is dropped into the quenching tank so as to minimize the thermal shock. A temperature of about 1500° F. is, therefore, maintained in the vertical passage 25 for the specified steel composition and that part of the horizontal kiln at the right of baffle 54 by means of the controlled globar units 55 at this end of the kiln. A supplemental electrical heater, such as resistance wire 56, may be placed in the vertical passage 25 to insure that the temperature is maintained high enough to prevent the compact temperature from lowering to the $A_{1-3}$ line before it drops into the quenching tank. The temperature of the gas introduced to the various parts of the muffle may likewise be controlled to aid in this regulation of muffle temperature. Valves 57 are suitably provided in each of the pipes to give the desired control of gas volume. Thus, it will be seen that the compacts are carried progressively through the furnace and then dropped abruptly into the fluid in the quenching tank. The temperature of the quenching fluid is held constant by a thermostatically controlled heating and cooling unit, as will be understood. The furnace walls 40 and 41 may end above the quench tank or, if desired, these walls may have an extension 48 which dips below the top of the fluid bath, depending on the coolant used.

One of the major problems in the production of a body of irregular shape, such as a saw tooth, has been the formation of a laminated structure or one having more or less parallel stress planes which are presumably formed by a shearing action developed by excessive pressure in compacting the powder. As will be seen from Fig. 5 of the drawing, the tooth has an upwardly projecting wedge shaped cutting edge portion 70, and the laminated structure tends to form in that wedge of the tooth which requires the strongest structure. I have found that it is not feasible to distribute the powder in the mold in a mathematically calculated arrangement which theoretically provides the right number of powder grains in each vertical cross sectional plane of the tooth, since the compacting operation causes lateral flow and the grains do not move straight downwardly as would be necessary in accordance with that mathematical distribution.

Figure 2:
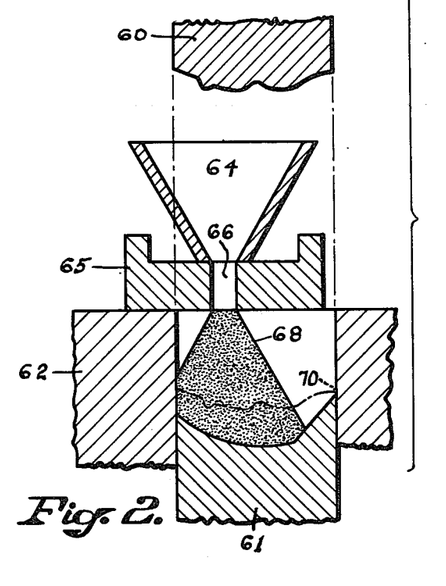
Fig. 2 is a diagrammatic sectional view of the compacting mold, illustrating the manner of distributing the powder therein.

I take advantage of the lateral flow of the powder and provide such a distribution of the powder that it will flow during the compacting operation laterally or towards the cutting edge of the tool. Since the saw tooth is arcuate or somewhat of a quarter-moon shape with the horns up, as shown in Fig. 2, I pile the powder in the central portion of the mold in such a position and quantity that the plungers will thrust that powder pile laterally and cause it to move into the far wedge shaped portion of the mold cavity and to be there compacted at the moment that the main central body is compressed. This distribution occurs at the moment of final compacting and all of the powder is subjected to substantially the same pressure, although the pressure may be slightly higher in the wedge portion and thus give a greater density there.

The mold press may be of suitable construction. In the form illustrated in Fig. 2, it comprises an upper plunger 60, shaped as an upper die and a lower die plunger 61, both of which are mounted for movement relative to the mold ring 62 shaped to provide an opening of rectangular cross section corresponding to a horizontal sectional plane through the tooth, as will be understood. To fill the mold according to my invention, I provide removable filling apparatus including a hopper 64 and a slide 65. The latter is arranged to slide over the mold cavity and to be definitely positioned relative thereto. The slide has a small square or round opening 66 communicating with the hopper and through which all of the powder is introduced to the mold cavity. That opening is so located as shown in Fig. 2 that the powder piles in the mold with its apex at the opening 66 and cannot fill the cavity. The lower die is lowered sufficiently and the height of the mold ring is such that all of the powder in its precalculated weighed amount will lie within the mold cavity as a pile 68 having its apex remote from the cutting edge 70 of the tooth and preferably nearer the heel 71 (Fig. 5) of the tooth and with a large space at the right of the point. The apex is about ⅔ of the width of the mold from the right-hand wall which contacts the tooth edge. When the plunger dies move towards each other to the relative positions indicated by the dotted line in Fig. 2, the powder must flow laterally towards the edge 70.

This lateral flow occurs gradually and the powder is crowded into the point by a movement which prevents forming the laminations heretofore had when the mold was entirely filled. In the prior method, the tooth had substantially parallel stress or cleavage planes running into the tooth apex, as caused by the vertical pressure. In the new method, the pressure of lateral flow is largely at right angles to the direction of plunger movement, and peculiarly the pressure crowds the powder into the point under a higher pressure than is found elsewhere. This results in the point having substantially the density of forged and rolled steel, whereas the main body of the tooth has a lesser density. By this procedure, I can get the required density at the cutting edge and yet use a moderate pressure on the compact, as is desirable, since laminations or cleavage planes tend to form under higher pressures.

The essential principle of this method as above described is believed to lie in so piling the powder in the mold that it must flow substantially lengthwise and not crosswise of the cutting edge portion of the tooth when compacted. The direction of flow relative to the plungers is determined by the location of the tooth in the press, and it is essentially towards the cutting edge.

The standard cutting tool steels made of iron, carbon, manganese and molybdenum have a density from 7.6 to 7.8. The following table shows the densities of the compact and the sintered and quenched tooth of Figs. 6 and 7 at the various stages. This table indicates that in the cutting edge where the density is of critical importance, I have succeeded in making a steel cutting edge of satisfactory characteristics. The tooth or compact compositions comprised 1.0% of carbon, 0.5% manganese, 0.1% molybdenum, the balance being annealed, substantially pure electrolytic iron powder. The tooth was made in accordance with the above described method of curves #1 and #2, Fig. 4, in which it was initially compacted at 40 tons per square inch, then sintered at 2050° F. and cooled quickly to and held at about 1300° F., then after further cooling coined at 40 tons per square inch, resintered at 2050° F. and quenched quickly to 600° F. The densities were as follows:

| | Density |
|---|---|
| Compact | 6.80 |
| Sintered and cooled (1st stage) | 6.90 |
| Coined | 7.10 |
| Resintered and quenched (2nd stage) | 7.12 |
| Density at cutting edge | 7.47 |

Figs. 6 and 7 are photomicrographs of the same cutting tooth, taken at 1000 magnification, the former being at the end of the first annealing quench #1 (Fig. 4) and the latter after coining and the hardening quench #2. Fig. 6 shows that the product of the first quench at about 1300° F. is composed primarily of spheroidal cementite $Fe_3C$ in a ferritic matrix. The manganese is believed to be present as a carbide combined with the iron carbide in the cementite. Molybdenum and the other alloy metals, except silicon, nickel and cobalt, are believed to form carbides similarly. The tooth of Fig. 6 had a Rockwell hardness of B–80. It was ductile and coinable because of its being held near but below the $A_{1-3}$ line to develop the spheroidal precipitate of cementite in a ferrite matrix. The rounded particles of Fig. 6 are the spheroidal precipitates.

Figure 4:
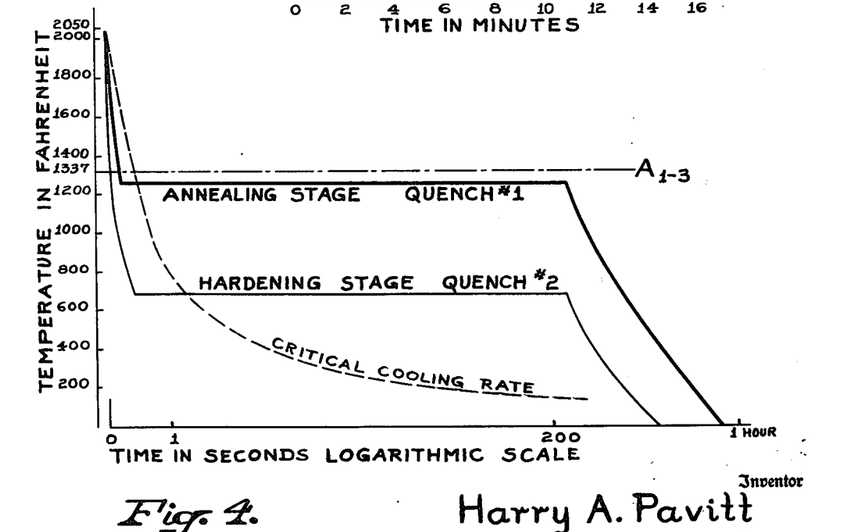
Fig. 4 is an approximate temperature-time plot of the sintering and cooling curves.
Figure 8:
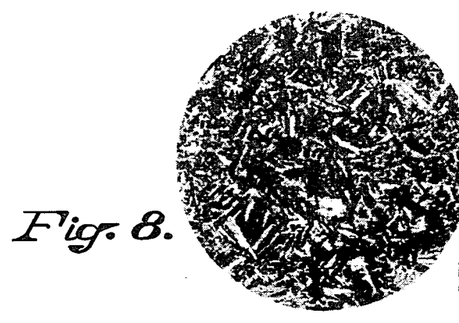
Fig. 8 is a similar view of a rolled and forged saw tooth of the same composition as made by standard procedure.

Fig. 7 shows the final product after coining the Fig. 6 structure and again sintering and quenching according to curve 2 of Fig. 4, and cooling for a given period at about 600° F. to develop the tempered martensite. It had a structure similar to that of a standard piece of rolled and forged steel of the same composition, which is shown in Fig. 8. The powder product of Fig. 7 had a somewhat finer crystal structure and more uniform dispersion of tempered martensite. The Rockwell hardness of the tooth of Fig. 7 on the C scale was between 48 and 50. The structure of Fig. 7 shows a fine dispersion of precipitated cementite. The needle structure of the photomicrographs is the tempered martensite. There is no visible porosity or excessive non-metallic inclusions in the powder compact. The size of each of the teeth made by this method remains uniform, since many thousand compacts may be made by one set of dies; whereas the dies used in making drop forgings wear comparatively quickly and the tooth size increases.

It will now be appreciated that the steps of sintering, coining and quenching will apply to compacts made of other ingredients besides those above set forth. The compact may be made of various materials, such as finely divided steel of the final composition, or steel particles intermixed with carbon containing particles, such as graphite or metal carbides or ferroalloys containing combined carbon, which are proportioned to give the required percentages of tool steel components, as above tabulated. That is, all of the iron, carbon and alloying metal may be in a single compound, such as an annealed, high carbon tool steel powder, or part of the carbon may be in such an alloy and part present as graphite or in a metal compound. If a steel powder is employed, it should be annealed to render it briquettable; or the harder steels and similar materials may be intermixed with ductile or annealed pure iron powder which will unite at the surface with the harder bodies when compacted. Given a compactable powder or mixture of powders, the sintering, quenching and coining steps above described may be employed to produce first the ductile, coinable product of the first quench (curve 1, Fig. 4) and then the mass may be coined to increase its density. The coined body is unsuited for use as a tool, so it is again sintered and quenched according to curve 2 to give a tempered martensitic structure that will serve for an edged tool. It will also be appreciated that, to increase the density still further, the coining and sintering steps may be repeated, provided the principles illustrated in curves 1 and 2 of Fig. 4 are followed. The end results depend on these steps.

It has heretofore been considered that solid carbon will not diffuse into pure Fe during sintering but will remain dispersed in an uncombined state. I have found, on the contrary, that graphite will diffuse into the iron under the conditions of my process, and I believe that this is caused or aided by the presence of the alloying metal, such as Mn or Mo, which I add as a ferro alloy. Although part of the carbon may be present in that ferro alloy, yet the free graphite diffuses readily and forms the desired austenitic structure during sintering. The controlled atmosphere which is devoid of oxygen, $CO_2$ and water vapor aids in controlling the final carbon content and preventing either carburization or decarburization. Also, it may be noted that if the compact is not quenched according to curve #1 (Fig. 4) the second sintering step tends to leave zones at the locations of the original grain boundaries which are rich in carbon and alloy metal, and this tends to accentuate the boundary formation after the second quench. By my method, the carbon and alloy metal are left as a finely divided precipitate of satisfactory distribution at the end of the first sinter and quench.

It will also be understood by metallurgists that the presence of hardening metals, such as Mn and Mo, modifies the phase rule diagram of Fig.

3 showing only iron and carbon but without affecting the principles of this invention as herein set forth, and that the invention is adequately described by reference to the behavior of iron and carbon under the sintering and quenching steps above described.

Many modifications may be made in the process and the apparatus above described within the above defined principles of this invention, and the above description is to be interpreted as giving the preferred methods of making cutting tools and not as imposing limitations on the appended claims.

I claim:

1. The method of making a steel saw tooth comprising molding a compact of steel forming powders and sintering the same, and characterized in that a predetermined amount of powder comprising ductile iron, graphite and an alloyable percentage of an alloying metal selected and proportioned to form a tool steel is fed to an expanded pressure mold shaped to form an elongate body terminating at one end in a portion tapering towards a cutting edge and powder for the edge portion is initially located remote therefrom, and wherein pressure is applied to the mold to compress the elongate faces of the tooth and cause said remote powder to flow laterally at an angle to the direction of the mold pressure and lengthwise of the tooth directly towards said tapering edge portion and to be compacted by movement along a narrowing passage progressively towards the edge and provide a progressively higher density towards the edge and form a compact devoid of pressure laminations in the edge portion.

2. In the art of making a steel article by compacting in a mold a definite amount of powdered ingredients comprising iron, carbon and an alloying metal proportioned to form tool steel, sintering the compact to develop an austenitic structure, cooling and coining the same, resintering the coined article and cooling it, the method of making a steel saw tooth which has an irregular elongated shape terminating at one end in a tapered cutting edge characterized in that the powder compact comprises iron as its major ingredient, from 0.4 to 1.5 per cent of carbon and an alloyable percentage of one or more metals selected from the group consisting of manganese, molybdenum, silicon, chromium, tungsten, vanadium, nickel and cobalt and proportioned to form a tool steel, and that powder for the tooth edge portion is initially located in the mold remote from the related edge portion of the mold and the powder is compacted by pressure applied to the long faces of the powder compact and is forced laterally of the pressure direction to flow directly towards the cutting edge, and further characterized by quenching the compact directly after the first sintering step from a temperature above 1500° F. at which the compact material is an austenitic solid solution of the ingredients to a temperature below 1337° F. and above 1000° F. at a rate exceeding the critical cooling rate of the steel and holding the compact above 1000° F. to develop a ductile structure of spheroidal cementite in a ferritic matrix free from a grain boundary network and thereafter cooling and coining the ductile steel, and further characterized by sintering the coined compact and quenching it from a temperature above 1500° F. at which the compact material is an austenitic solid solution of the ingredients to a temperature range between 800° F. and 400° F. at a rate exceeding the critical cooling rate of the steel and holding the compact within said range to develop a tempered martensitic structure free from a grain boundary network.

HARRY A. PAVITT.

References Cited in the file of this patent

UNITED STATES PATENTS

| Number | Name | Date |
|---|---|---|
| 1,996,725 | Kingsbury | Apr. 2, 1935 |
| 2,188,155 | Payson | Jan. 23, 1940 |
| 2,284,638 | Clark et al. | June 2, 1942 |
| 2,289,081 | Shortell | July 7, 1942 |
| 2,301,805 | Harder | Nov. 10, 1942 |
| 2,333,573 | Kalischer | Nov. 2, 1943 |
| 2,372,605 | Ross | Mar. 27, 1945 |
| 2,411,073 | Whitney | Nov. 12, 1946 |
| 2,431,095 | Tucker | Nov. 18, 1947 |
| 2,435,511 | Rice | Feb. 3, 1948 |